US005775999A

United States Patent [19]

Hansson et al.

[11] Patent Number: 5,775,999

[45] Date of Patent: Jul. 7, 1998

[54] HYDRAULIC TORQUE IMPULSE GENERATOR HAVING A PRESSURE RESPONSIVE BYPASS FLOW VALVE

[75] Inventors: Gunnar Christer Hansson, Stockholm; Knut Christian Schoeps, Tyresö ; Sten Herman Olsson, Enskede, all of Sweden

[73] Assignee: Atlas Copco Tools AB, Nacka, Sweden

[21] Appl. No.: 748,520

[22] Filed: Nov. 8, 1996

Related U.S. Application Data

[63] Continuation of Ser. No. 380,609, Jan. 30, 1995, abandoned.

[30] Foreign Application Priority Data

Jan. 28, 1994 [SE] Sweden .................................. 9400270

[51] Int. Cl.[6] ........................................................ F16D 3/80

[52] U.S. Cl. ............................... 464/25; 173/93; 173/93.5

[58] Field of Search .......................... 464/17, 25; 81/463, 81/464, 465, 466; 173/93, 93.5

[56] References Cited

U.S. PATENT DOCUMENTS

| | | | |
|---|---|---|---|
| 3,192,739 | 7/1965 | Brown | 464/25 |
| 3,196,636 | 7/1965 | Piatt et al. | 464/25 |
| 3,283,537 | 11/1966 | Gillis | 173/93 X |
| 3,292,391 | 12/1966 | Kramer | 464/25 |
| 3,304,746 | 2/1967 | Kramer et al. | 173/93 X |
| 4,175,408 | 11/1979 | Kasai et al. | 464/25 |
| 4,683,961 | 8/1987 | Schoeps . | |
| 4,735,595 | 4/1988 | Schoeps | 464/25 |
| 4,789,373 | 12/1988 | Adman | 464/25 |
| 4,967,852 | 11/1990 | Tatsuno | 464/25 X |
| 5,217,079 | 6/1993 | Kettner et al. | 173/93 X |

FOREIGN PATENT DOCUMENTS

| | | | |
|---|---|---|---|
| 0 920 850 | 2/1973 | Canada | 464/25 |
| 0 185 639 | 6/1986 | European Pat. Off. . | |
| 0 353 106 | 1/1990 | European Pat. Off. . | |

*Primary Examiner*—Donald P. Walsh
*Assistant Examiner*—William A. Rivera
*Attorney, Agent, or Firm*—Frishauf, Holtz, Goodman, Langer & Chick, P.C.

[57] ABSTRACT

A hydraulic torque impulse generator having a drive member (10) with a fluid chamber (12) and an output spindle (11) extending into the fluid chamber (12) and being provided with a movable seal element (19) and an axial seal ridge (22) for cooperation with oppositely disposed axial seal lands (13, 14) in the fluid chamber (12) to, thereby, divide the fluid chamber (12) into one high pressure compartment (H.P.) and one low pressure compartment (L.P.) during a limited angular interval of relative rotation between the drive member (10) and the output spindle (11), and a valve means comprising an elongate contact element (24, 44) which is supported in an axial groove (23, 43) in the seal ridge (22 ), which groove (23, 43) communicates with the high pressure compartment (H.P.) such that the contact element (24, 44) is urged into its sealing condition by the fluid pressure at pressure magnitudes above a certain level. A sealing barrier (27) around the output spindle (11) comprises a clearance seal (33), a low pressure chamber (39) and a spring biassed piston (35) and prevents temperature related pressure variations in the fluid chamber (12).

20 Claims, 3 Drawing Sheets

HYDRAULIC TORQUE IMPULSE GENERATOR HAVING A PRESSURE RESPONSIVE BYPASS FLOW VALVE

This application is a Continuation of application Ser. No. 08/380,609, filed Jan. 30, 1995 now abandoned.

BACKGROUND OF THE INVENTION

This invention relates to a hydraulic torque impulse generator, primarily intended for a screw joint tightening tool.

In particular, the invention concerns an impulse generator comprising a drive member with a fluid chamber, an output spindle extending into the fluid chamber and carrying at least one movable seal element and having at least one axial seal ridge for sealing cooperation with axially extending linear seal lands in the fluid chamber for dividing the fluid chamber into at least one high pressure compartment and at least one low pressure compartment during a limited angular interval at relative rotation between the drive member and the output spindle, and a valve means providing for a bypass flow between the high and low pressure compartments during the limited angular interval as the pressure in the high pressure compartment is below a certain level.

Torque impulse generators of this type, including a pressure responsive bypass valve, have a favourable operation characteristic in that the acceleration delay after each generated torque impulse is substantially shortened. Such a delay is due to a maintained sealing cooperation between the seal means of the drive member and the output spindle, which in impulse generators without a bypass valve makes even a relatively low pressure level in the high pressure compartment brake the drive member and hinder a quick acceleration before the next impulse.

By employing a pressure responsive bypass valve a low pressure short-circuiting fluid flow between the high and low pressure compartments of the fluid chamber is obtained, which results in a higher impulse rate and a higher output power of the impulse generator. It also results in a shorter torque impulse of a higher magnitude.

A torque impulse generator of the above type is described in U.S. Pat. No. 3,283,537. This known impulse generator is of the single blade type in which the fluid chamber is divided into one high pressure compartment and one low pressure compartment by sealing cooperation between seal lands in the fluid chamber and the seal blade and a seal ridge on the output spindle. A pressure responsive valve is provided to establish a bypass flow past the seal ridge/seal land fluid seal at pressure magnitudes below a certain level in the high pressure compartment. This bypass valve comprises a spring biassed tubular piston sealingly guided in a bore in the cylinder wall of the drive member or in the output spindle.

A problem concerned with this known impulse generator is that its bypass valve provides for a very small bypass flow only, and that the size of the valve is very much limited to the available space in the two alternative locations, namely the fluid chamber wall and the output spindle. This known bypass valve arrangement also means an undesirable complication of the drive member or output spindle design.

Another previously known example on a pressure responsive bypass control valve in a torque impulse generator is shown in U.S. Pat. No. 4,683,961. This known device comprises an annular double acting leaf spring valve member which is located in one of the end walls of the impulse generator and arranged to control a bypass flow through an annular passage communicating with the high and low pressure compartments.

By this previously known device there is certainly obtained a larger bypass flow between the high and low pressure compartments compared to the above discussed prior art device. However, an obvious drawback resides in an increased space demand for the bypass valve as well as a more complicated impulse generator design.

Another problem concerned with both of the two above discussed prior devices relates to a comparatively long lasting sealing cooperation between the moving parts of the impulse generator, i.e. long sealing interval in relation to the relative rotation between the drive member and the output spindle. Due to this structural characteristic of the prior art devices, the employment of a bypass valve is not enough to keep up an acceptable impulse frequency. There is also needed a certain amount of yielding of the hydraulic fluid volume. Since the hydraulic fluid in itself has a very small compressibility only, there is usually introduced a certain amount of air into the hydraulic fluid chamber. This air volume increases the ability of the hydraulic fluid volume to yield to pressure, whereby the sealing cooperation time between the moving parts of the impulse generator is shortened and the impulse frequency is increased.

Another common way of shortening the sealing engagement time between the moving parts is to provide a nonvariable leak passage between the fluid chamber compartments. This arrangement is usually combined with the introduction of a certain amount of air in the fluid chamber.

However, both of the above described prior art methods to increase the impulse frequency are detrimental to the energy of each impulse as well as of the total capacity of the impulse generator. Accordingly, both of these measures are nothing but compromises to obtain an acceptable operation of the impulse generator.

Another reason why a certain amount of air is usually introduced in the fluid chamber is to obtain a resiliency of the fluid volume that is large enough to absorb temperature related volume changes of the hydraulic fluid during operation, thereby protecting the fluid chamber seals from too high static pressure levels. No matter the reason for introducing air into the fluid chamber, the air is detrimental to the impulse energy and the output capacity of the impulse generator.

SUMMARY OF THE INVENTION

The main object of the invention is to provide a hydraulic torque impulse generator operating at a high frequency and delivering torque impulses of a high energy by introducing a very short lasting sealing cooperation between the moving parts at impulse generation using a pressure responsive bypass control valve.

Another object of the invention is to provide a hydraulic torque impulse generator delivering torque impulses of a high energy at a high frequency and being of an uncomplicated design.

The above problems are solved by a torque impulse generator according to the invention which comprises a valve means of a simple design and which provides an effective but short lasting sealing interval between the drive member and the output spindle as well as a large bypass flow area, thereby providing a high impulse frequency and a high output capacity.

BRIEF DESCRIPTION OF THE DRAWINGS

Preferred embodiments of the invention are described below with reference to the accompanying drawings.

In the drawings.

Figure 1:
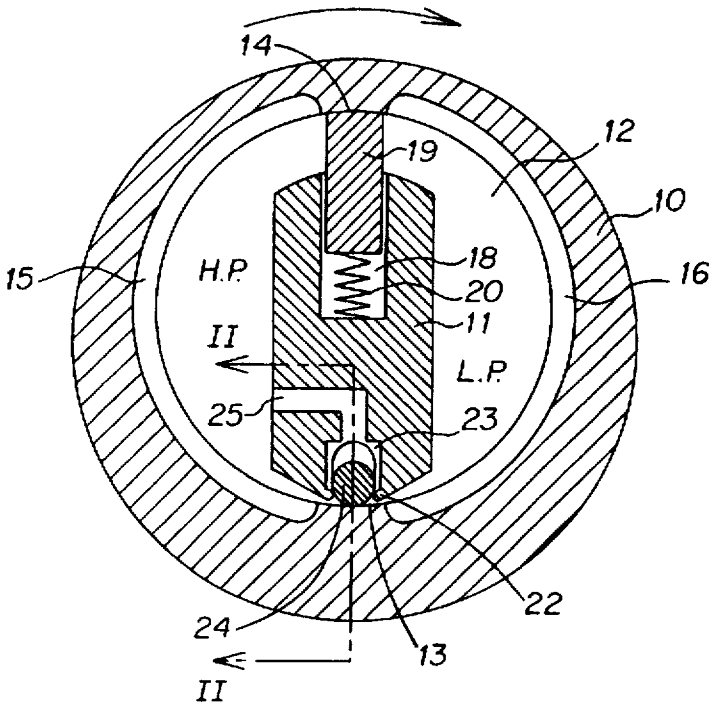
FIG. 1 shows a cross section through an impulse generator according to one embodiment of the invention.

The torque impulse generator shown in the drawing figures comprises a cylindrical drive member 10 drivingly connected to a pneumatic or electric rotation motor (not shown), and an output spindle 11. The drive member 10 has an excentrically disposed cylindrical fluid chamber 12 into which the rear end of the output spindle 11 extends. In a common way, the fluid chamber 12 is formed with two axially extending linear seal lands 13, 14 which are located diametrically opposite each other and separated by part-circumferential recesses 15, 16.

DETAILED DESCRIPTION

The output spindle 11 is formed with an axially extending radial slot 18 movably supporting a seal element or blade 19. A spring 20 disposed in the slot 18 exerts an outwardly directed bias force on the seal element 19.

Diametrically opposite the slot 18, the output spindle 11 is formed with an axially extending seal ridge 22 for sealing cooperation with the seal land 13 during a short interval of each revolution of the drive member 10 relative to the output spindle 11. Seal land 14 is disposed at a larger radius and does not cooperate with the seal ridge 22. It is cyclically engaged by the seal element 19 though.

The seal land 13 is very narrow, i.e. it has a small circumferential extent, in order to limit the sealing interval visavi the seal ridge 22 to thereby reduce the sealing duration during operation of the device.

In an impulse generator of the type illustrated in the drawing figures, the width of the seal land 13 is adapted to provide a sealing cooperation with the seal ridge 22 that extends over an angle of just five degrees or less of the relative rotation between the drive member 10 and the output spindle 11. It is to be observed that an equivalent result would be obtained by instead forming the seal land 14 and the seal element 19 with narrow contact surfaces.

The seal ridge 22 comprises an axially extending groove 23 which supports a contact element 24 and which is connected to the fluid chamber 12 via a passage 25. According to the embodiment of the invention illustrated in FIGS. 1 and 2, the contact element 24 comprises a rod with circular cross section and which is preformed to a slightly bent shape. See FIG. 2. The contact element 24 is arranged to be elastically deformed from its nonlinear inactive shape to a linear active shape by the fluid pressure communicated to the groove 23 via the passage 25 at each impulse generating pressure build-up in the fluid chamber 12. It should be noted that the fluid communication passage 25 in the output spindle 11 could as well be connected to the high pressure compartment H.P. via the seal element slot 18.

Figure 3:
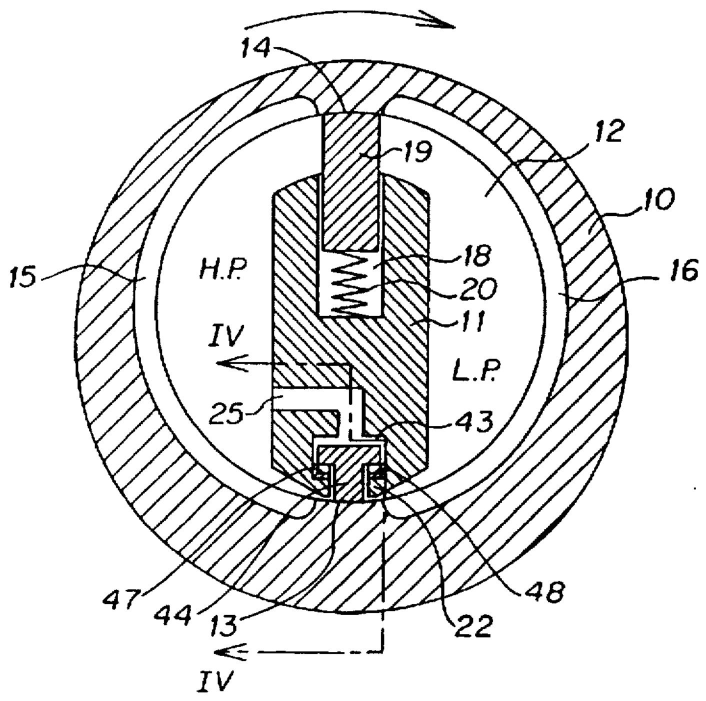
FIG. 3 shows a cross section through an impulse generator according to another embodiment of the invention.
Figure 4:
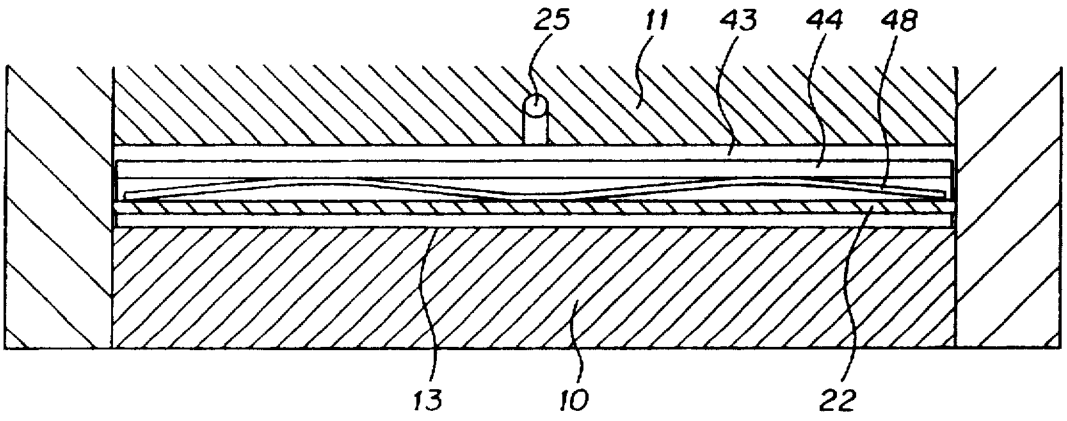
FIG. 4 shows a longitudinal section along line IV—IV in FIG. 3.

In the embodiment of the invention shown in FIGS. 3 and 4, the output spindle 11 is provided with a T-shaped longitudinal groove 43 connected to the high pressure compartment H.P. of the fluid chamber 12 via the passage 25. In the groove 43 there is supported an elongate contact element 44 of a T-shaped cross section.

Figure 2:
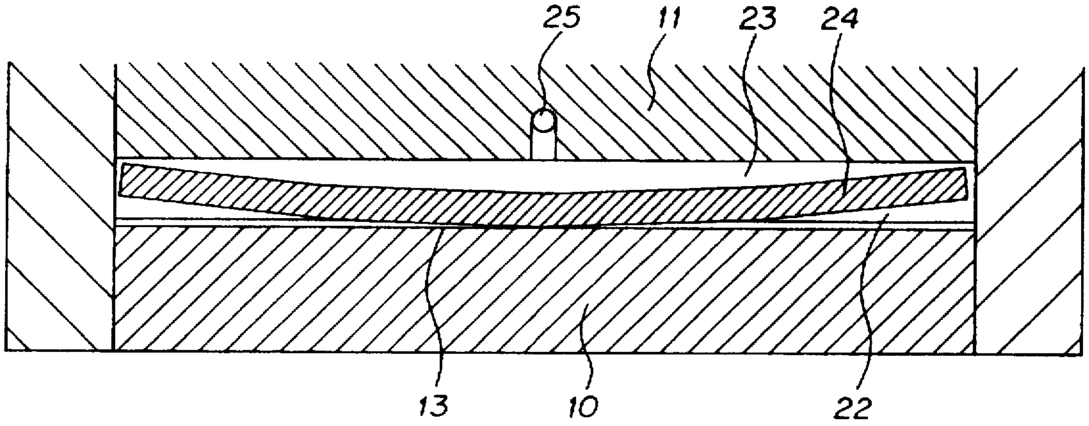
FIG. 2 shows a longitudinal section along line II—II in FIG. 1.

In contrast to the embodiment shown in FIGS. 1 and 2, the contact element 44 has a linear pre formed shape and is arranged to be radially displaced in parallel between a retracted inactive position and a protruding active position. Between the contact element 44 and the groove 43 there are inserted two wave shaped leaf springs 47, 48. These springs 47, 48 bias the contact element 44 toward the retracted inactive position.

Figure 5:
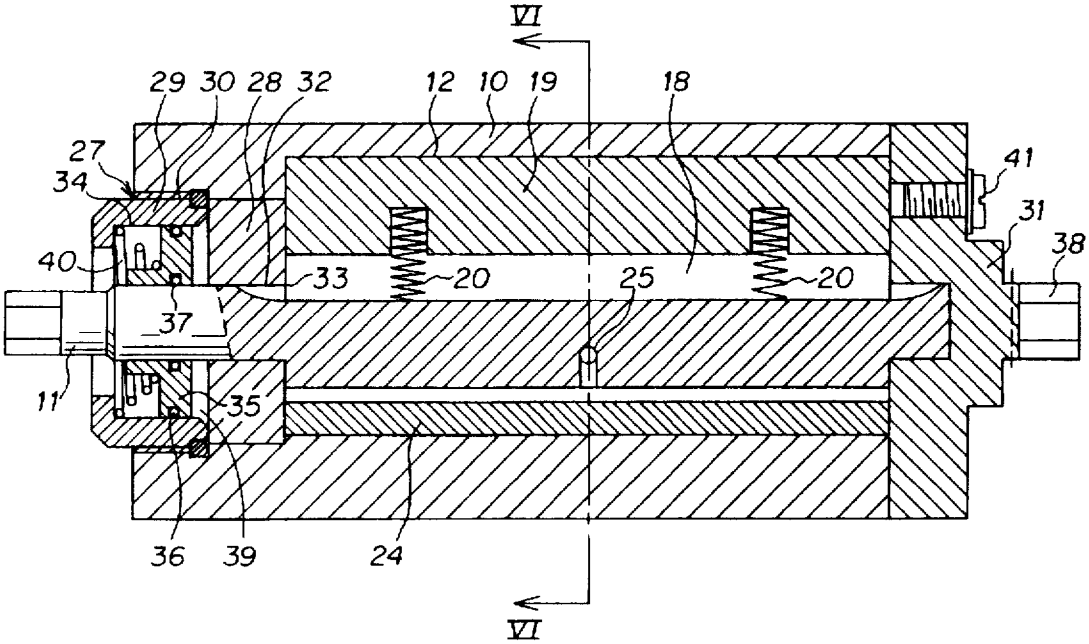
FIG. 5 shows a longitudinal section of an impulse generator according to still another embodiment of the invention.
Figure 6:
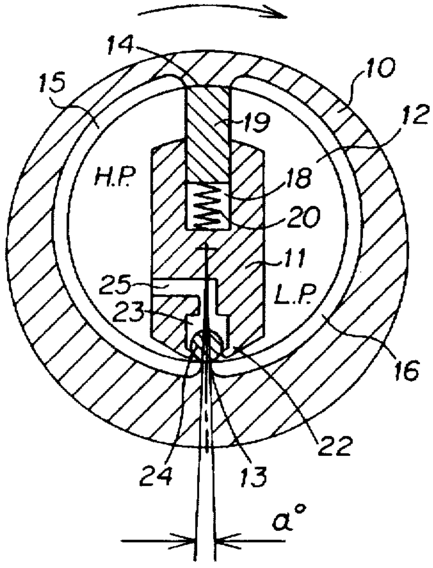
FIG. 6 shows a cross section along line VI—VI in FIG. 5.

According to the embodiment of the invention shown in FIGS. 5 and 6, the drive member 10 is provided with a sealing barrier 27 at its forward end. This sealing barrier 27 includes means for effectively sealing off the fluid chamber 12 relative to t he atmosphere and for absorbing temperature related volume changes of the hydraulic fluid at a maintained low static pressure.

A torque impulse generator including this type of sealing barrier around the output spindle is previously known per se through U.S. Pat. No. 4,789,373.

The impulse generator shown in FIGS. 5 and 6 comprises, however, a drive member 10 the forward end wall of which consists of an element 28 secured by a ring element 29 threadingly received in a socket portion 30 of the drive member 10. At its rear end, the drive member 10 comprises an end wall 31 provided with a hexgonal drive extension 38 and oil filler plug 41.

The forward end wall 28 is formed with a central opening 32 through which the output spindle 11 extends. A clearance seal 33 is formed in the opening 32 between the fluid chamber end wall 28 and the output spindle 11. The ring element 29 comprises a cylinder bore 34 in which is displaceably guided an annular piston 35. The latter carries on its outer periphery a seal ring 36 for sealing engagement with the cylinder bore 34 and on its inner periphery a seal ring 37 for sealing engagement with the output spindle 11. The piston 35 forms together with the bore 34 and the end wall 28 a low pressure chamber 39 the volume of which is variable due to the movability of the piston 35. A spring 40 exerts a bias force on the piston 35 toward the end wall 28 thereby seeking to decrease the volume of chamber 39. A concentric aperture in the ring element 29 connects the piston 35 to the atmosphere.

In contrast to the two previously described examples, this embodiment of the invention comprises a contact element in the form of a straight rod 24 which does not have any spring means to ensure discontinuation of the sealing cooperation with the land 13.

In operation, the drive member 10 is rotated by the motor, whereas the output spindle 11 is coupled to a screw joint to be tightened. During each limited interval of the relative rotation between the drive member 10 and the output spindle 11, wherein the seal land 13 coincides with the seal ridge 22 and the seal land 14 coincides with the seal element 19, the fluid chamber 12 is divided into a high pressure compartment H.P. and a low pressure compartment L.P. The abruptly rising fluid pressure in the high pressure compartment H.P. is communicated to the groove 23 via the passage 25 to urge the contact element 24 into sealing contact with the seal land 13. In the embodiment of the invention illustrated in FIGS. 1 and 2, however, the contact element 24 is elastically deformed from the nonlinear inactive shape illustrated in FIG. 2 to the linear active shape. In its linear active shape, the contact element 24 establishes a fluid tight seal with the seal land 13.

In this active seal condition of the contact element 24, the pressure in the high pressure compartment H.P. rises to its peak level, whereby the kinetic energy of the drive member 10 is transferred to the output spindle 11 as a torque impulse. At this energy transfer between the drive member 10 and the output spindle 11, the rotation speed of the drive member 10 is decreased substantially. This means that after a very short while the pressure in the high pressure compartment H.P. decreases as well. However, as soon as the fluid pressure has decreased below a certain level the spring force inherent in the elastically deformable contact element 24 makes the latter reassume its nonlinear shape, thereby breaking the sealing cooperation with the seal land 13 in the fluid chamber 12. A short-circuiting bypass communication is established and the pressure difference between the fluid chamber compartments is quickly brought down to a very low level.

This takes place while the seal ridge 22 and the seal element 19 still coincide with the seal lands 13 and 14, respectively, and avoids the prior art problem of having a remaining pressure difference between the fluid chamber compartments that would hinder a quick acceleration of the drive member 10 before the succeeding impulse.

The operation order of the impulse generator according to the embodiment of the invention shown in FIGS. 3 and 4 is very similar to that of the above described embodiment.

Accordingly, the contact element 44 is shifted to its active sealing position by the pressure in the high pressure compartment H.P. of the fluid chamber 12 against the bias force exerted by the leaf springs 47, 48. As soon as the main part of the kinetic energy of the drive member 10 has been transferred to the output spindle 11 and the pressure in the high pressure compartment H.P. has decreased to a certain level, the contact element 44 is retracted to its inactive position by the springs 47, 48. Hereby, a short-circuiting bypass flow is established past the seal land 13 and seal ridge 22, and the drive member 10 is able to start accelerating immediately to gain kinetic energy before the next impulse.

During operation of the tool shown in FIGS. 5 and 6, the relative rotation between the drive member 10 and the output spindle 11 results in repeated pressure peaks of short duration being generated in the high pressure compartment H.P. of the fluid chamber 12 each time the seal ridge 22 and the seal land 13 of the output spindle 11 and the inertia drive member 10, respectively, and the seal element 19 and the seal land 14 interact.

Each pressure peak propagates through the passage 25 to exert an activating force on the contact element 24, thereby ensuring an effective sealing cooperation between the contact element 24 and the seal land 13.

As to the operation order of the sealing barrier 27, it is to be noted that the width of the clearance seal 33 between the output spindle 11 and the end wall opening 32 is carefully chosen so as to prevent the pressure peaks generated in the fluid chamber 12 from reaching the low pressure chamber 39. The latter is reached only by the hydraulic fluid which due to a temperature related increase in the static pressure slowly passes through the clearance seal. The nominal or static fluid pressure, i.e. pressure other than torque pulse generating pressure peaks, is determined by the spring 40. The latter is preferably no stronger than what is needed to overcome the frictional resistance of the piston seal rings 36 and 37. This means that the fluid pressure acting on the piston seal rings 36 and 37 is very low and that seal rings of any conventional standard type may be used. The actual size of the low pressure chamber 39 is determined by the actual volume of the hydraulic fluid, which in turn depends on the amount of fluid originally put into the fluid chamber 12 via plug 41 and on the actual temperature of the fluid. After some time of operation, the hydraulic fluid gets hot and expands. The surplus fluid pours out through clearance seal 33 and causes the piston 35 to move away from end wall 28. The only occurring growth in pressure is due to the further compression of spring 40 and does not increase the risk for leakage.

As the tool is cooled down after completed operation the fluid volume decreases, which means that fluid starts pouring back through the clearance seal 33 into the fluid chamber 12, continuously backed up by the spring biassed piston 35 in the low pressure chamber 39.

Although the invention in its two above described embodiments is illustrated with its spring biassed contact element located on the output spindle 11, the invention is not limited thereto. The contact element may as well be disposed on the drive member 10, in particular in a groove in the seal land 13. In such a case, the seal ridge 22 on the output spindle 11 would be ungrooved and adapted to sealingly cooperate with the contact element disposed on the drive member 10.

We claim:

1. Hydraulic torque impulse generator, comprising:

a drive member (10) with an eccentrically disposed fluid chamber (12) and a torque impulse receiving output spindle (11) extending into said fluid chamber (12), said output spindle (11) having at least one radially movable seal element (19) and at least one axially extending seal ridge (22), said fluid chamber (12) having axially extending linear seal lands (13, 14) for cooperating with said at least one radially movable seal element (19) and said at least one seal ridge (22) to form a seal and divide said fluid chamber (12) into at least one high pressure compartment (H.P.) and at least one low pressure compartment (L.P.) during a limited angular interval of relative rotation between said drive member (10) and said output spindle (11); and a valve means (24; 44) for enabling a bypass flow between said high and low pressure compartments (H.P., L.P.) during said limited angular interval when a hydraulic fluid pressure in said high pressure compartment (H.P.) is below a predetermined level, said valve means (24; 44) comprising an elongate contact element (24; 44) movably supported in an axially extending groove (23;43) in each of said at least one seal ridge (22) or in one of said seal lands (13), said contact element (24; 44) being shiftable between a nonsealing condition and a sealing condition, said contact element (24; 44) in said sealing condition being arranged to sealingly cooperate with said seal land (13) or said seal ridge (22) to block said bypass flow and to more fully form said seal which divides said fluid chamber into said high and low pressure compartments;

a passage means (25) provided to communicate said groove (23; 43) with said high pressure compartment (H.P.), thereby enabling the hydraulic fluid pressure in said high pressure compartment (H.P.) to shift said contact element (24; 44) from said nonsealing condition to said sealing condition at pressure magnitudes in said high pressure compartment (H.P.) above said predetermined level; and at least one of said seal lands (13, 14) being circumferentially dimensioned to provide for a sealing cooperation with at least one of (i) said at least one radially movable seal element (19) and said contact element (24; 44), and wherein said sealing cooperation extends over less than 5° of the relative rotation between said drive member (10) and said output spindle (11).

2. An impulse generator according to claim 1, wherein said contact element (24) comprises a rod with a circular cross section.

3. An impulse generator according to claim 2, wherein said contact element (24; 44) is spring biassed toward said nonsealing condition.

4. An impulse generator according to claim 2, wherein said contact element (24) is preformed to have a slight arc shape extending over substantially the entire length of said contact element (24).

5. An impulse generator according to claim 4, wherein said contact element (24; 44) is spring biassed toward said nonsealing condition.

6. An impulse generator according to claim 2, wherein said contact element (24) is preformed to have a nonlinear shape and is arranged to be elastically deformed into a linear shape by said hydraulic fluid pressure in said high pressure compartment (H.P.), said contact element (24) thereby being shifted from said nonsealing condition to said sealing condition.

7. An impulse generator according to claim 6, wherein said contact element (24; 44) is spring biassed toward said nonsealing condition.

8. An impulse generator according to claim 6, wherein said contact element (24) is preformed to have a slight arc shape extending over substantially the entire length of said contact element (24).

9. An impulse generator according to claim 8, wherein said contact element (24; 44) is spring biassed toward said nonsealing condition.

10. An impulse generator according to claim 8, wherein said fluid chamber (12) communicates with a yielding means (35, 39) for absorbing temperature related volume changes of hydraulic fluid in said fluid chamber (12), thereby preventing substantial changes in static fluid pressure in said fluid chamber (12).

11. An impulse generator according to claim 10, wherein said contact element (24; 44) is spring biassed toward said nonsealing condition.

12. An impulse generator according to claim 10, wherein said yielding means (35, 39) comprises a sealing barrier (27) formed around said output spindle (11), and includes a clearance type high pressure seal (33) and an annular spring biassed piston (35) provided with low pressure seals (36, 37).

13. An impulse generator according to claim 12, wherein said contact element (24; 44) is spring biassed toward said nonsealing condition.

14. An impulse generator according to claim 1, wherein said contact element (44) is preformed to have a linear shape, and a spring means (47, 48) is arranged to bias said linear shaped contact element (44) toward said nonsealing condition.

15. An impulse generator according to claim 1, wherein said fluid chamber (12) communicates with a yielding means (35, 39) for absorbing temperature related volume changes of hydraulic fluid in said fluid chamber (12), thereby preventing substantial changes in static fluid pressure in said fluid chamber (12).

16. An impulse generator according to claim 15, wherein said contact element (24; 44) is spring biassed toward said nonsealing condition.

17. An impulse generator according to claim 16, wherein said yielding means (35, 39) comprises a sealing barrier (27) formed around said output spindle (11), and includes a clearance type high pressure seal (33) and an annular spring biassed piston (35) provided with low pressure seals (36, 37).

18. An impulse generator according to claim 17, wherein said contact element (24; 44) is spring biassed toward said nonsealing condition.

19. An impulse generator according to claim 1, wherein said contact element (24; 44) is spring biassed toward said nonsealing condition.

20. An impulse generator according to claim 1, wherein said valve means further comprises a spring device arranged to bias said contact element (24; 44) toward said nonsealing condition.

* * * * *

UNITED STATES PATENT AND TRADEMARK OFFICE

CERTIFICATE OF CORRECTION

PATENT NO. : 5,775,999

DATED : July 7, 1998

INVENTOR(S) : HANSSON et al.

It is certified that error appears in the above-identified patent and that said Letters Patent is hereby corrected as shown below:

Column 8, line 25 (claim 17, line 1), change "claim 16" to --claim 15--.

Signed and Sealed this

Tenth Day of April, 2001

Attest:

Nicholas P. Godici

NICHOLAS P. GODICI

*Attesting Officer* *Acting Director of the United States Patent and Trademark Office*